May 7, 1974 D. J. SHARP ET AL 3,809,627

ANODIZED CERMET FILM COMPONENTS AND THEIR MANUFACTURE

Original Filed Nov. 19, 1968

United States Patent Office 3,809,627
Patented May 7, 1974

3,809,627

ANODIZED CERMET FILM COMPONENTS AND THEIR MANUFACTURE

Donald J. Sharp, Trenton, N.J., and Richard D. Sutch, Allentown, Pa., assignors to Western Electric Company, Incorporated, New York, N.Y.

Original application Nov. 19, 1968, Ser. No. 776,962, now Patent No. 3,644,188. Divided and this application July 22, 1971, Ser. No. 165,376
Int. Cl. C23b *5/52, 11/02*
U.S. Cl. 204—37 R 3 Claims

ABSTRACT OF THE DISCLOSURE

A film-forming metal and a ceramic are co-sputtered on a glass substrate to form an anodizable cermet film whose resistance, as measured between a pair of conductive terminals deposited thereon, is less than a predetermined value. The film is anodized electrolytically to increase or "trim" its terminal resistance to the predetermined value. Interaction between the ceramic and the anodically-grown oxide of the film-forming metal during the anodizing step stabilizes the terminal resistance so that the trimmed value is maintained within close tolerances during subsequent thermal aging and operation.

This is a division of application Ser. No. 776,962, filed Nov. 19, 1968, now U.S. Pat. 3,644,188.

BACKGROUND OF THE INVENTION

As is well known, a high-quality thin film resistor may be formed by first vacuum-depositing a layer of tantalum on a nonconductive substrate in a nitrogen-argon atmosphere, and then providing conductive pads on spaced portions of the film to serve as terminals. Unfortunately, the long-term resistance stability of the resulting tantalum nitride element tends to deteriorate with decreasing film thickness. Since the element resistance is also inversely proportional to its film thickness, tantalum nitride elements that are not impractically thin from a stability view point have a relatively low upper limit of resistance. Moreover, such tantalum nitride resistors have only a moderate temperature stability when subjected to the thermal aging step that normally follows the manufacture of the film.

Recent developments in the manufacture of "cermet" films (i.e., those containing molecularly dispersed mixtures of metallic and ceramic materials) have led to the production of film resistors exhibiting much higher resistance values and greater temperature stability than tantalum nitride films of comparable dimensions. The constituents of such cermet films generally include a refractory oxide, such as silica, and a heat-oxidizable metal such as chromium or an alloy thereof.

Cermet films of this type may be laid down by vacuum-depositing the constituent materials on a common substrate. After depositing the contact pads, the film is annealed to change its internal structure so that subsequent exposure to operating and other environmental temperatures will not cause significant changes in its resistance value. In practice, such films are commonly deposited in proportions effective to yield an element resistance that is higher than a predetermined value. After the terminals are in place, the annealing step "coarse-trims" the resistance to just above the design value, after which a final resistance trim may be given to the element by subjecting it to a short-duration, large-amplitude temperature rise, as by passing a pulse of heating current therethrough.

It will be appreciated that extreme care must be taken during the heat-trimming of such resistors to prevent the burning of the resistor terminals and the damaging of the film.

SUMMARY OF THE INVENTION

The present invention provides highly stable cermet film resistance elements that may be trimmed to final value in one step without the application of heat. To accomplish this the conductive constituent of the cermet coating on the element is a film-forming metal (illustratively tantalum).

The parameters of the resulting film are chosen such that the terminal resistance of the element is somewhat lower than the design value. The element is then subjected to an electrolytic anodizing step to convert a portion of the tantalum in the film to tantalum pentoxide, whereupon the resulting decreased proportion of tantalum metal in the film increases its net resistance. The anodizing step is terminated when the resistance has reached the design value.

The sputtered oxide constituent (illustratively an oxide of silicon) in the cermet film reacts or disperses itself within the anodically-grown oxide of tantalum during the anodizing step to stabilize the film so that the latter may be subsequently subjected to a thermal-aging step without great resistance change from the trimmed value.

Deposition of the cermet film may be accomplished by co-sputtering the constituent materials from a perforated cathode of tantalum metal and a quartz backing plate, respectively. The relative proportions of tantalum and silicon oxide in the film is controllable by varying the amplitude of the sputtering voltage or, alternatively, by adjusting the size of the perforations in the screen.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
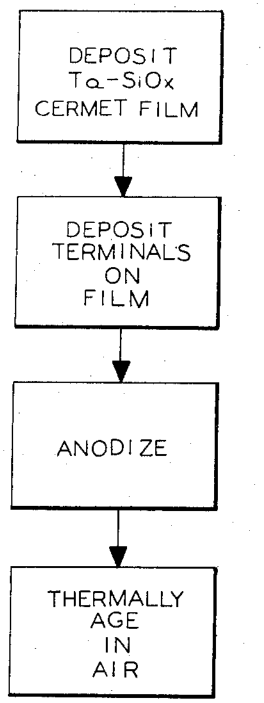
FIG. 1 is a simplified flow diagram of a process for manufacturing a cermet film resistor in accordance with the invention.

The flow chart of FIG. 1 represents, in general terms, an overall process for forming and trimming a cermet film resistor in accordance with the invention. A film-forming metal, illustratively tantalum (Ta) and a ceramic are simultaneously vacuum-deposited on a suitable nonconductive substrate to form a cermet film. (The term "ceramic" is used herein to designate generally a stable refractory metal oxide such as silica, alumina, or beryllia, or mixtures of such oxides.) The illustrative ceramic employed in the following description is an oxide of silicon having the general composition SiOx.

The film may be patterned into individual under-valued resistance elements by any suitable process, such as photo etching. Conductive pads are vacuum-deposited or plated on spaced film portions of each element to serve as terminals to which conductive leads may be bonded. Each terminated element is then anodized electrolytically to convert a portion of the tantalum constituent of its film to an oxide (predominantly tantalum pentoxide, $TaO_5$) to increase the resistance of the element to value. Finally, each anodized element may be subjected to thermal aging in air for enhanced stability without exhibiting a significant departure from its trimmed resistance value.

Figure 2:
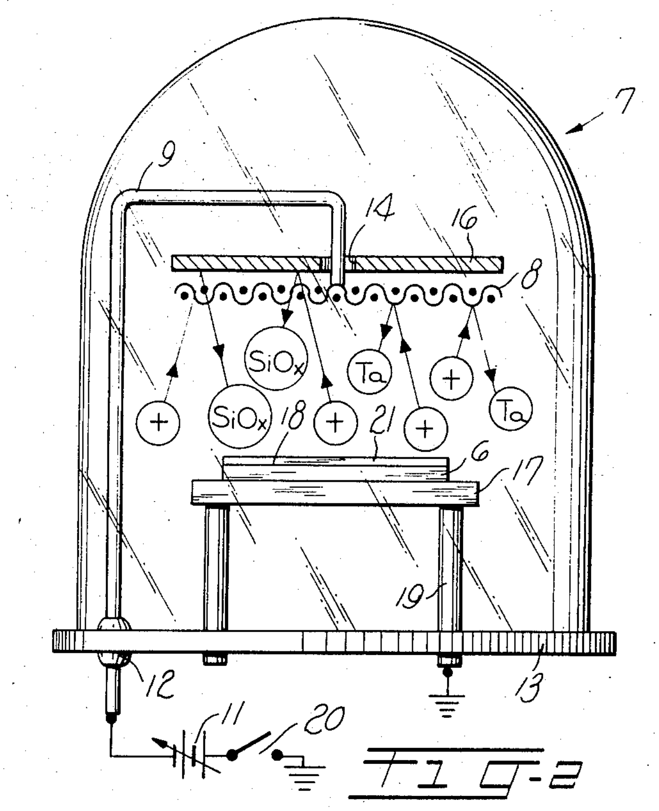
FIG. 2 is a pictorial representation of a vacuum deposition apparatus suitable for sputtering a cermet film on a substrate.

As shown in FIG. 2, the film deposition step is accomplished by co-sputtering Ta and SiOx on a suitable non-conducting substrate 6, illustratively of glass, within a conventional deposition chamber 7. The chamber 7 is first evacuated and then partially filled with argon or other inert gas at a pressure suitable for sputtering. A sputtering cathode 8 in the form of a perforated tantalum screen is coupled via a supporting conductive rod 9 to a grounded source 11 of negative DC potential, which is made variable for reasons discussed below.

The lower end of the rod 9 is supported in an insulating bushing 12 extending through an electrically grounded, conductive bottom plate 13 of the chamber 7. The upper end of the rod 9 extends through a central aperture 14 in a quartz backing plate 16 that is disposed adjacent the cathode 8 to serve as a source of SiOx molecules in the film to be sputtered. The backing plate 16 is mounted in the chamber 7 by suitable means (not shown). The anode of the chamber 7 includes a conductive platform 17 electrically connected to and supported by the grounded plate 13 via a plurality of legs 19—19 for positioning a face 18 of the substrate below and in alignment with the tantalum cathode 8 and the quartz backing plate 16.

Upon the closure of an actuating switch 20 in series with the source 11, a high DC potential is applied between the cathode 8 and ground to cause ionization of the argon in the chamber 7. The resulting positive gas ions (designated by suitably labeled circles in the drawing) are accelerated toward the perforated cathode 8 by the sputtering potential. A portion of the accelerated ions strike the cathode and dislodge tantalum atoms therefrom. The remaining ions pass through the perforations in the cathode and strike the quartz plate 16, so that molecules of SiOx are dislodged therefrom.

The co-sputtered atoms are collected as a molecularly dispersed layer 21 of Ta and SiOx particles on the face 18 of the underlying substrate 6. The relative concentrations of Ta and SiOx in the layer 21, which control the magnitude of the sheet resistivity and temperature coefficient of resistance of the layer, may be varied by adjusting the voltage amplitude of the source 11. In general, the proportion of tantalum in the layer 21 varies directly with the amplitude of the sputtering voltage. Moreover, while not specifically illustrated, further limited variations in the relative proportions of Ta and SiOx in the layer 21 may be obtained by changing the size of the perforations in the screen 8, with larger perforations resulting in larger relative SiOx concentrations.

Figure 3:
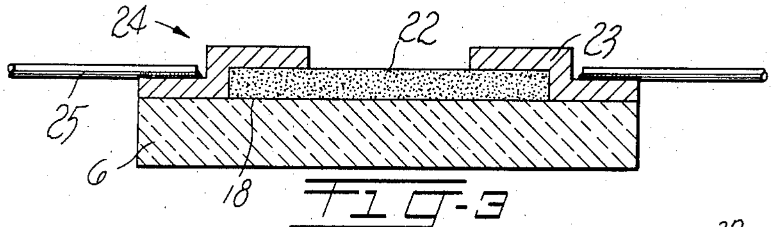
FIG. 3 is a front elevation, in section, of a cermet film resistor formed by the process of FIG. 1.

Following film deposition, the layer 21 may be delineated into a plurality of separate resistance patterns, such as strips. One such strip is designated by the numeral 22 in FIG. 3. It will be understood that other pattern shapes, such as the conventional serpentine configuration, may be employed where appropriate.

The pattern shaping may be accomplished by conventional photo etching techniques after deposition of the layer 21 (FIG. 2). One such process is described by W. B. Reichard at pages 6–7 in the "Western Electric Engineer," vol. 7, No. 17, (April 1963). Alternatively, the film may be formed originally in the desired pattern by sputtering through a suitable refractory metal mask (not shown), which is held tightly over the face 18 of the substrate 6; this latter technique may be analogous to that described in U.S. Pat. 2,849,583, issued to N. Pritikin on Aug. 26, 1958.

Referring again to FIG. 3, a pair of conductive contact pads 23—23 (or "land areas") are deposited in any suitable manner on opposite ends of the cermet strip 22 to form a terminated resistance element represented by the numeral 24. In practice, the pads 23 may be laid down by evaporating successive layers of (1) chromium or a nickel-chromium alloy (2) copper and (3) platinum or other noble metal on the substrate 6 and the overlying strip 22 through openings in a suitable mask (not shown). Further details of the deposition of the pads 23 are described in the copending application of R. F. Brewer and B. Piechocki, Ser. No. 577,743, filed Sept. 7, 1966.

External access to the element 24 is facilitated by affixing a pair of conductive leads 25—25 to the respective contact pads 23—23, as by ultrasonic bonding.

It has been found that noise at the contact between the pads 23 and the cermet strip 22 is minimized if, during the film-deposition step, the concentration of tantalum in the upper portion of the layer 21 (FIG. 2) is increased. This improvement, which is especially marked where relatively low sheet resistance films are employed, appears to be optimized when the Ta concentration approaches 100% at the uppermost surface of the film. Such tantalum enrichment may be accomplished, e.g., by increasing the sputtering voltage from the source 11 near the end of the deposition step.

Figure 4:
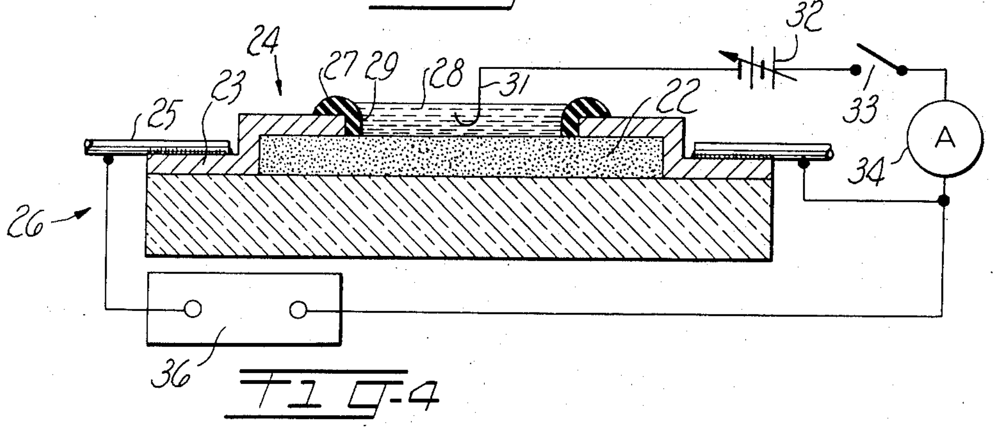
FIG. 4 is a schematic representation of an undervalued resistor of the type shown in FIG. 3 while undergoing electrolytic anodization to trim its resistance to value.

The area and thickness of the strip 22 (FIG. 3) is selected so that the resistance of the element 24, as measured between the leads 25, is less than a predetermined design value. In order to trim the element 24 to value, the element is subjected, as shown in FIG. 4, to an electrolytic anodizing operation within a suitable apparatus 26, which may be of the general type described in U.S. Pat. 3,148,-129, issued to H. Basseches et al. on Sept. 8, 1964. In particular, the element 24 is placed in a dam 27 within which is confined on electrolyte 28. The contact pads 23 are masked from the electrolyte 27 by a surrounding dam wall 29, which may be formed from beeswax.

The cermet strip 22 constitutes the anode of the anodizing apparatus 26. The cathode is a tantalum rod 31 immersed in the electrolyte 28. Anodizing current is supplied by a variable DC source 32, which is connected between the cathode and the right-hand contact pad 23 of the element 24 through a switch 33 and an ammeter 34.

When the switch 33 is closed, anodizing current flows through the electrolyte 28 and converts a portion of the tantalum in the cermet strip 22 into tantalum pentoxide at the rate of about 16 angstroms of tantalum pentoxide ($TaO_5$) per output volt of the source 32. The anodizing voltage, which is gradually increased during the formation of the anodically grown oxide to maintain the anodizing current at a constant value, is applied until a suitable resistance monitoring means 36 connected across the element 24 indicates that the desired design value of resistance has been attained. The switch 33 is then opened to terminate the anodization process.

While involving a mechanism not fully understood, the conversion of a portion of the tantalum in the strip 22 to $Ta_2O_5$ by anodizing appears to trigger a redox reaction between the SiOx film constituent and the anodically grown $Ta_2O_5$ during the anodizing step. This reaction results in a high degree of temperature stability of the anodized element 24 at its trimmed resistance value. In particular, such a reaction appears to prevent further oxidation of the anodized layer 22.

The anodized element 24 may be thermally aged in air for a short interval to provide additional stability during subsequent exposure of the element to operating and other anticipated environmental changes. Because of the above-mentioned reactions between $Ta_2O_5$ and SiOx in the film during the anodizing step, the change in resistance of the element 24 during such thermal aging and subsequent operation is typically less than 2%.

From the above discussion, it is seen that the Ta-SiOx cermet film layer 21 (FIG. 2) may be anodized by a process analogous to that used in trimming tantalum thin film resistors and in forming dielectric layers for tantalum film capacitors. Moreover, the composition represented by the anodized mixture of Ta and SiOx in the layer 21 renders the latter highly suitable as a capacitor dielectric as well as a resistive film coating.

The following examples of the manufacture and trimming of an anodizable cermet film resistor in accordance with the invention are given for illustrative purposes and are not intended to limit the generality of the foregoing description.

EXAMPLE 1

The co-sputtering arrangement for the cermet film took the general form shown in FIG. 2 and included a perforated screen of tantalum metal having dimensions 2 x 3 inches and a flat quartz backing plate having dimensions 2 x 3 inches. The quartz plate was placed in contact with the screen. Six 1½" x 33" x 1/40" glass substrates to be coated were supported in pairs on an anode platform located 2 to 2½ inches from the tantalum screen.

The successive pairs of substrates were subjected to successively higher DC cathode-to-anode sputtering voltages in a 100% argon atmosphere under a pressure of 30 microns. In particular, the first two substrates were subjected to a voltage of 4 kv.; the next two, to 4.5 kv.; and the last two, to 5 kv. In each case, the cathode current and the deposition time were held constant at 50 ma. and 35 minutes, respectively. The average thickness of the resulting sputtered film was about 4450 A. and the average size of the tantalum crystals in the film was less than 1000 A.

The sheet resistance and the specific resistivity of the deposited films each varied in inverse proportion to the magnitude of the sputtering voltage. Specifically, when the puttering voltage was decreased from 5 kv. to 4 kv., the average sheet resistance of the deposited films increase from 7.3 to 26.3 ohms per square, and the average specific resistivity increased from 303 to 1175 micro-ohm centimeters.

Each of the resulting films was shaped, using conventional photo etching techniques, into a plurality of serpentine resistors patterns having approximately 392 "squares" each. Contact pads that included successive layers of Nichrome, copper, and platinum were evaporated on the terminal portions of each pattern to form individual resistance elements, and aluminum leads were ultrasonically bonded to the pads.

The resistance of each individual element was then measured at 30° C. and —20° C., and its temperature coefficient of resistance (which was negative in sign) was computed in a normal fashion. It was found that the average temperature coefficient of eight typical elements derived from the films sputtered with the lowest voltage (i.e. 4 kv.) was about —176 p.p.m., while the average temperature coefficient of seven typical elements on the substrates subjected to the highest sputtering voltage (5 kv.) was about —8.2 p.p.m. Nine typical elements on the substrates subjected to the intermediate sputtering voltage (4.5 kv.) displayed an average TCR of —98.5 p.p.m.

Each of the resistance elements was anodized to 55 volts for 30 minutes in a 1% solution of acetic acid in deionized water to convert a portion of the finely crystallized tantalum in its film-to-tantalum pentoxide. As a result, both the resistance and the TCR of each element was increased, the latter in the negative direction. In particular, the average resistance of the elements subjected to the 4.0 kv. sputtering voltage increased from 12.8 K. to 13.8 K. as a result of the anodizing step; the average value of the elements subjected to the 4.5 kv. anodizing voltage increased from 34.7 K. to 37 K.; and the average value of the elements subjected to the 5.0 k.v. sputtering voltage increased from 24.8 K. to 26.7 K. Proportional increases occurred in the temperature coefficient of resistance of each element.

The anodized elements were subsequently thermally aged in air for twenty minutes at 538° C. During the thermal-aging step, the elements sputtered at 4 k.v., 4.5 k.v., and 5 k.v. exhibited resistance changes limited to ranges of 2%, 0.7%, and 1.1%, respectively, around the value previously obtained after anodizing. By comparison, tantalum nitride resistors of comparable thickness typically exhibit an average resistance change of ±15% or more under similar conditions.

EXAMPLE 2

In a similar procedure, aluminum oxide ($Al_2O_3$) was substituted for the SiOx ceramic constituent used in Example 1. The co-sputtering arrangement for the resulting $Ta-Al_2O_3$ film included a ten-mesh tantalum screen in contact with a five inch diameter backing plate of sintered aluminum oxide. The dimensions of the substrates and the measuring apparatus were similar to those of Example 1.

Successive substrates were subjected to successively higher DC sputtering voltages for an average time of 25 minutes in a 100% argon atmosphere and under an average pressure of 35 microns. In particular, one substrate was subjected to a sputtering voltage of 2.5 kv., while additional substrates were subjected to voltages that were successively greater by 0.5 kv. steps to a final value of 5 kv. The average thickness of the resulting sputtered $Ta-Al_2O_3$ films was about 2450 A., and the average size of the tantalum crystals in the film was less than 100 A.

The increase in the sputtering voltage from 2.5 to 5 kv. caused the average sheet resistance of the deposited films to decrease from 350 to 32 ohms per square and the average specific resistivity to decrease from 92,000 to 720 microohm centimeters.

The resulting films were patterned into resistors in the manner described in Example 1. The average temperature coefficient of the resistors derived from the film sputtered with the lowest voltage (i.e., 2.5 kv.) was about —424 p.p.m., while the average temperature coefficient of the elements on the film subjected to the highest voltage (5 kv.) was about —170 p.p.m. Elements on the film subjected to an intermediate sputtering voltage of 4.0 kv. displayed an average TCR of —248 p.p.m.

The resistors were anodized in the manner of Example 1 and then thermally aged in air at 290° C. for a period of 100 hours. No separate differential resistivity measurements were made after the anodizing step alone, but it was found that the elements exhibited an average resistance change of 4.7% during the combined anodizing and thermal-aging steps.

Various other combinations of film-forming metals and ceramics may be employed in the practice of the invention. For example, nitrided tantalum may be used in place of pure tantalum as the metal constituent. Additionally, other film-forming metals such as aluminum, hafnium, or niobium may be employed in place of tantalum.

What is claimed is:

1. A composition of matter comprising the reaction product obtained by electrolytically anodizing a molecularly dispersed mixture of tantalum and a ceramic, in a 1% solution of acetic acid, with a gradually increasing anodizing current to a value of 55 volts which is maintained for 30 minutes.

2. A composition of matter comprising the reaction product obtained by electrolytically anodizing a molecularly dispersed mixture of tantalum and an oxide of silicon, in a 1% solution of acetic acid, with a gradually increasing anodizing current to a value of 55 volts which is maintained for 30 minutes.

3. A composition of matter comprising the reaction product obtained by electrolytically anodizing a molecularly dispersed mixture of tantalum and an oxide of silicon, in a 1% solution of acetic acid, with a gradually increasing anodizing current to a value of 55 volts which is maintained for 30 minutes, and thereafter thermally aging the anodized mixture.

References Cited

UNITED STATES PATENTS

| | | | |
|---|---|---|---|
| 2,647,079 | 7/1953 | Burnham ---------- | 204—38 E |
| 3,567,597 | 3/1971 | Hovey et al. ------- | 204—38 A |

HOWARD S. WILLIAMS, Primary Examiner
R. L. ANDREWS, Assistant Examiner

U.S. Cl. X.R.

204—56 R, 58